Aug. 8, 1950     H. E. BARBER     2,518,114
TIRE BEAD AND RIM SEPARATING LEVER

Filed July 19, 1946     2 Sheets-Sheet 1

INVENTOR.
HIRAM E. BARBER
BY

Aug. 8, 1950     H. E. BARBER     2,518,114
TIRE BEAD AND RIM SEPARATING LEVER
Filed July 19, 1946     2 Sheets-Sheet 2
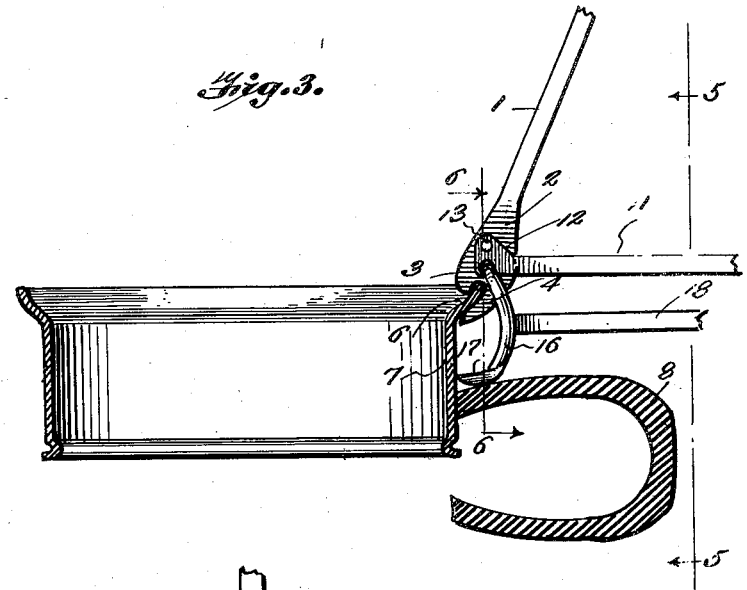
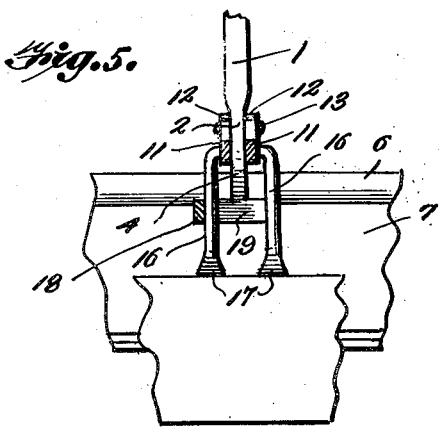
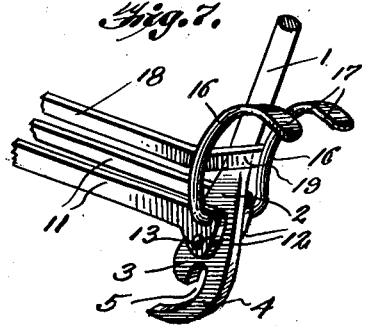
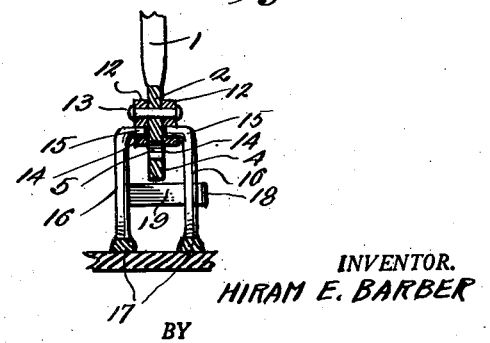
INVENTOR.
HIRAM E. BARBER
BY Patented Aug. 8, 1950

2,518,114

UNITED STATES PATENT OFFICE 2,518,114

TIRE BEAD AND RIM SEPARATING LEVER

Hiram E. Barber, Crete, Nebr.

Application July 19, 1946, Serial No. 684,822

2 Claims. (Cl. 157—1.17)

This invention relates to a tire removing tool and it is one object of the invention to provide a tool by means of which large tires, such as used upon trucks and buses, may be easily broken loose from a wheel rim and removed therefrom.

Another object of the invention is to provide a tool so constructed that when it is in use a lever carrying jaws at one end may have its jaws applied to a side flange of the rim, a second lever carrying arms at one end moved to bring its arms into position for pressing engagement with the outer side of the heel of the tire casing, and a third lever to which the second lever is pivoted when swung about its pivoted connection with the first lever and apply pressure to the second lever and cause the tire casing to be forced off of the wheel rim.

Another object of the invention is to provide a tool which is of light weight, very strong, and capable of easily dislodging a large tire from the rim of a wheel.

Another object of the invention is to provide a tire removing tool which is of simple construction, easy to operate, and capable of being manufactured at small cost.

The invention is illustrated in the accompanying drawings wherein:

Fig. 3 shows the long pressure-applying lever of the tool swung to a position for applying pressure to the tire-engaging arms.

Fig. 5 is a view taken along the line 5—5 of Figure 3.

Fig. 6 is a sectional view taken along the line 6—6 of Figure 3.

Fig. 7 is a perspective view of the tool, portions of the levers being broken off.

Figure 1:
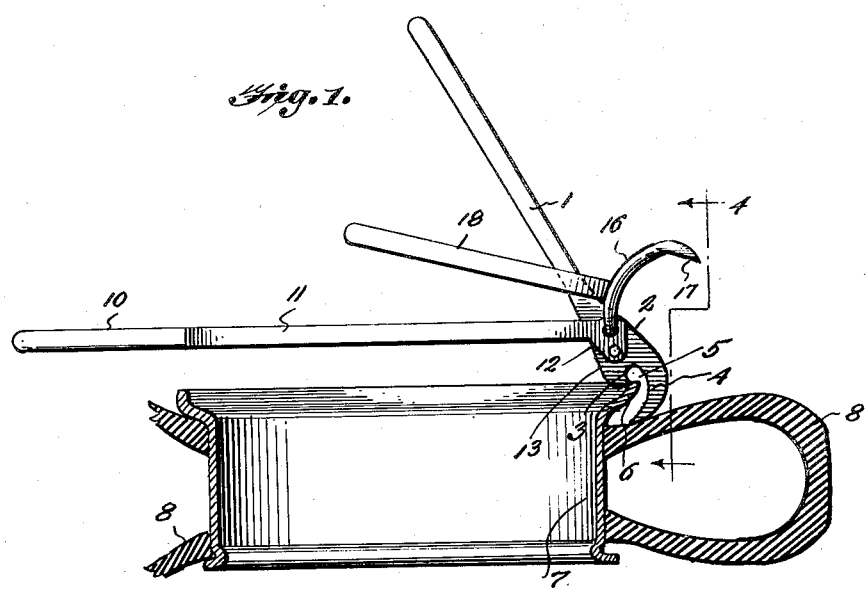
Fig. 1 is a view showing the tire removing tool in side elevation and applied to a wheel rim shown in section for removing the tire from the rim.

This improved tire removing tool has a rim-engaging lever 1 formed of strong metal and having at its front or inner end a head 2 which has flat side faces and is formed with bills or hooks 3 and 4 spaced from each other to provide a recess 5 into which the flange 6 of a wheel rim 7 fits when the tool is applied to the rim for removing a tire 8. Since the bill or hook 4 is curved longitudinally the lever 1 may have its head 2 applied to the flange of the wheel rim, as shown in Figure 1, and the lever then tilted from the inwardly inclined position shown therein to the outwardly inclined position of Figure 2 and the bill 4 will then engage under the flange 6 and cause the lever to be supported in the outwardly inclined position.

A relatively long lever 9 is formed from a strip of strong metal. This metal strip is bent midway its length to form a handle 10 of double thickness and arms 11 which are spaced from each other a sufficient distance to straddle the head 2 of lever 1 and at their front ends the arms are formed with heads 12 which are substantially triangular in order to provide portions which project from the arms 11 and are pivotally mounted at opposite sides of the head 2 by a pin 13. Openings 14 are formed through the heads 12 to receive pintles 15 projecting inwardly from inner ends of arms 16. These arms 16 are curved longitudinally and have their free ends flattened to form feet 17 for engaging between the flange 6 of the rim and the confronting bead of the tire 8 and allow pushing force to be exerted without cutting the tire. The arms 16 are operated by a lever 18 formed from a bar of strong metal, and this lever has its inner or front end bent to form a side arm 19 extending between and welded to the arms 16. Since the side arm extends across the lever 1 the lever 18 may be swung about the pintles 15 as pivots and move the arms 16 from the raised position shown in Figure 1 to the lowered position shown in Figure 2, and since the arms 11 of the lever 9 are longer than the lever 1 this lever 9 may be swung about the pin from the position shown in Figure 1 to that shown in Figure 3.

Figure 2:
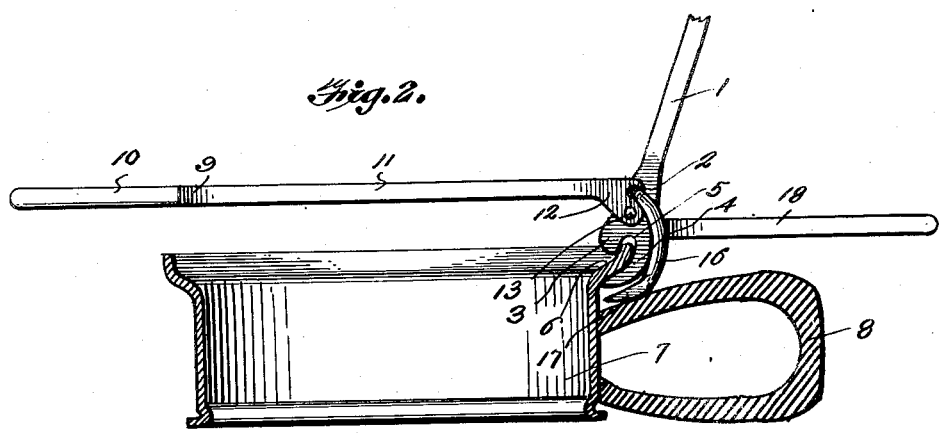
Fig. 2 is a view similar to Figure 1 showing the tire-engaging arms of the tool moved into position for pressing engagement with the tire.
Figure 4:
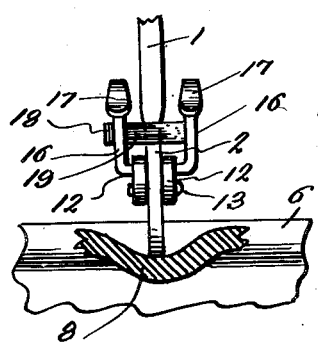
Fig. 4 is a view looking at the front or inner end of the tool, the view being along line 4—4 of Figure 1.

When the improved tire removing tool is in use it is applied to the rim of a wheel as shown in Figure 1, the wheel being placed flat upon the ground and the flange 6 of the rim being engaged in the recess 5 of the head 2 of lever 1. The lever 1 is then swung to the position shown in Figure 2 and as its bill 4 moves under the flange of the rim a portion of the heel of the tire 8 will be forced away from the flange and since the lever 1 will be tilted outwardly of the wheel rim and the bills or hooks engaged with side faces of the flange 6 the lever 1 will be supported in the position shown in Figure 2. After lever 1 has been swung to the outwardly inclined position a foot is placed upon lever 9 to hold it in a substantially horizontal position diametrically across the wheel rim and the lever 18 grasped and swung from the position shown in Figure 1 to that shown in Figure 2. As the lever 18 is swung upwardly and outwardly and then downwardly to the position in which it extends radially from the rim at a side of the tire 8 the arms 16 will be swung downwardly against the confronting side wall of the tire and into space between the flange 6 of the rim and the confronting bead of the tire. Pressure will thus be exerted upon the tire to break its bead loose from the tire rim and force this bead away from the flange 6 and partially across the rim. A foot is then placed upon the lever 18 to hold it in the position shown in Figure 2 and the handle 10 of lever 9 grasped and pull exerted to swing this lever upwardly and outwardly and then downwardly to the position shown in Figure 3 where it projects radially from the rim and angularly from the lever 1. In view of the fact that the pintles 15 move in a circular path about pin 13 from the position shown in Figure 2 to the lowered position shown in Figure 3 the arms 16 will be shifted downwardly and their wide and flattened feet 17 will exert pushing pressure against the tire across the wheel rim and dislodge the tire from the rim to such an extent that the tire may be easily removed from the rim, a puncture repaired and the tire replaced, or a new tire applied to the rim.

Having thus described the invention, what is claimed is:

1. A tire removing tool comprising a lever having a head at its front end formed with flat side faces and at its front end having a lug and a longitudinally curved bill defining a recess between the bill and the lug for receiving a side flange of a wheel rim and mounting the lever upon the flange for tilting movement transversely of the wheel rim, a second lever having a handle and arms extending therefrom and terminating in heads at their front ends disposed at opposite sides of the head of the first lever, a pin passing through the heads of the levers and pivotally mounting the second lever for swinging movement from a position in which it extends diametrically across a rim to a position in which it projects outwardly from the rim at a side of a tire mounted upon the rim, longitudinally curved arms having outer ends formed with feet for engaging between the rim flange and the confronting bead of a tire on the rim, said curved arms having inner ends formed with pintles projecting from their inner sides and rotatably engaged in openings formed in the heads of the second lever adjacent the pin which connects said first and second levers to pivotally mount the said curved arms, and a lever for actuating the curved arms having an end portion bent to form a side arm extending across the space between the curved arms in front of the front end of the second lever and rigidly fixed to the curved arms.

2. A tire removing tool comprising a lever having a front end provided with a slot for receiving a side flange of a wheel rim and tiltably mounting the lever in an upright position upon the flange said lever having a member for engaging between the flange and a bead of a tire as the lever is swung from its initial position, a second lever pivoted at its front end to the front end of the first lever for swinging movement from a position over a rim diametrically thereof to a position extending outwardly from the rim radially thereof at a side of a tire carried by the rim, and a third lever having at one end arms extending forwardly and rearwardly therefrom and having their rear ends pivoted to the front end of the second lever in eccentric relation to the pivot which joins the first and second levers and their front ends formed with feet for engaging between the flange of the rim and the bead of the tire to be removed.

HIRAM E. BARBER.

REFERENCES CITED

The following references are of record in the file of this patent:

UNITED STATES PATENTS

| Number | Name | Date |
| --- | --- | --- |
| 1,233,012 | Ashbaugh et al. | July 10, 1917 |
| 1,452,596 | De Fernelmont | Apr. 24, 1923 |
| 1,507,208 | Schlenker | Sept. 2, 1924 |
| 1,806,947 | Mjelva | May 26, 1931 |
| 2,293,467 | Kenworthy | Aug. 18, 1942 |
| 2,319,155 | Passanante | May 11, 1943 |
| 2,367,638 | McCulloch | Jan. 16, 1945 |

FOREIGN PATENTS

| Number | Country | Date |
| --- | --- | --- |
| 276,168 | Great Britain | Aug. 25, 1927 |